United States Patent [19]

Lindgren

[11] Patent Number: 4,973,683

[45] Date of Patent: Nov. 27, 1990

[54] METHOD OF CROSS-LINKING A POROUS POLYSACCHARIDE GEL

[75] Inventor: Göran E. S. Lindgren, Almunge, Sweden

[73] Assignee: Pharmacia AB, Uppsala, Sweden

[21] Appl. No.: 860,201

[22] Filed: May 6, 1986

[30] Foreign Application Priority Data

May 23, 1985 [SE] Sweden .................... 8502574

[51] Int. Cl.$^5$ .............................. C07H 1/00
[52] U.S. Cl. .................... 536/120; 536/11; 536/124
[58] Field of Search ........... 536/54, 55.1, 114, 120, 536/1.1, 47, 124

[56] References Cited

U.S. PATENT DOCUMENTS

| | | | |
|---|---|---|---|
| 3,507,851 | 4/1970 | Ghetre et al. | 536/54 |
| 3,723,408 | 3/1973 | Nordgren et al. | 536/114 |
| 3,723,409 | 3/1973 | Yueh | 536/114 |
| 3,959,251 | 5/1976 | Porath et al. | 536/1.1 |
| 4,174,440 | 11/1979 | Fujita et al. | 536/120 |

FOREIGN PATENT DOCUMENTS 8502574 1/1985 Sweden .

OTHER PUBLICATIONS

L. Holmberg, Doctorial Thesis, Swedish University of Agricultural Sciences (1983), pp. 28 and 29.
Popov et al., *Chemical Abstracts*, vol. 104, 1986, p. 35, No. 6655e.

*Primary Examiner*—John W. Rollins
*Assistant Examiner*—Elli Peselev
*Attorney, Agent, or Firm*—Fisher, Christen & Sabol

[57] ABSTRACT

A porous polysaccharide gel is cross-linked in that
(a) the gel is substituted with a monofunctional reagent having at least one functional group that can be activated,
(b) the functional group of the reagent is activated,
(c) the activated group is reacted,
(d) the resulting product is, optionally, reacted with the monofunctional reagent,
(e) the steps (b) and (c) are repeated, and
(f) the steps (d) and (e) are repeated at least once.

4 Claims, No Drawings

METHOD OF CROSS-LINKING A POROUS POLYSACCHARIDE GEL

TECHNICAL FIELD

The invention is related to a method of cross-linking a porous polysaccharide gel.

BACKGROUND ART

Cross-linked polysaccharide has in different forms become very important as a gel matrix for chromatographic separation, especially for biomolecules such as proteins, nucleic acids etc.

The chromatographic separation is carried out in a column packed with the matrix through which a liquid flow is forced. A sample which can be a mixture of different proteins, is introduced at the top of the column and then moves with the flow through the column. The proteins will be retarded on the matrix in such a manner that proteins having different properties, e.g., size, will be retarded differently and therefore separated.

By varying the concentration of polysaccharide when producing these gel matrices, different pore sizes can be obtained, the lower the concentration, the bigger pores, i.e., the higher exclusion limit. The size of the pores in proportion to the size of the biomolecules to be separated, is decisive for the separation.

The technique most known for the separation of biomolecules is based on diffusion of molecules into and out of these pores. At a fixed pore size, molecules that are bigger than the pores will be completely excluded, and therefore quickly elute from the column. If the protein mixture contains molecules which are smaller than these pores, a diffusion of the molecules into the pores will take place, these molecules being retarded. Due to differences of size of the molecules which diffuse into the pores, a greater or lesser retardation is obtained, the result being a separation according to the size of the molecules. This type of separation is called molecular sieving or gel filtration. However, it is assumed that the part of the gel matrix which is exposed to the molecules does not have any other interacting properties, i.e., the gel matrix shall be completely inert to the molecule mixture which is being chromatographed.

In other separation techniques, such as ion exchange, hydrophobic interaction, affinity etc., either properties that are naturally in the gel matrix or properties which, through a chemical change of the gel matrix, have been introduced into the pores, are utilized.

The separation technique has in recent years developed towards shorter separation times and higher resolution, this has led to rigid, small (5-10 micrometers) particles being used as matrices. Due to their softness, traditional polysaccharides have been produced in particle sizes from 40 micrometers upwards, and in spite of this, the separation has in some cases taken 10-20 hours to carry out. This is especially true of gel filtration and in particular when the exclusion limit has been high. This limit depends on the concentration of the polysaccharide as mentioned earlier.

Another common matrix which fulfills these new requirements is silica based gels. Silica is however not stable in aqueous solutions especially at a higher pH value (greater than 7.5). Since most separations of biomolecules are carried out in aqueous solution, this is unsatisfactory. Moreover, silica contains silanol groups which themselves have an ion exchange and/or strongly hydrogen bonding effect.

The traditional polysaccharide gel matrices can be stabilized by chemically cross-linking the polymer chains with each other. This cross-linking takes place between hydroxyl groups available on the polysaccharides and has been utilized for example in connection with agarose which has been cross-linked with epichlorhydrin (US 3,507,851) and other bifunctional reagents (US 3,860,573). In this context, a bifunctional reagent is a chemical compound which under the same conditions can react with both its functional groups. Other bifunctional reagents used are bis-epoxides, divinyl sulphon and dicarboxylic acid chlorides (GB 1352613).

Agar and agarose and some similar polysaccharides will form gels at fixed temperatures. Upon gelification, a macroporous gel is obtained and the size of the pores is determined as mentioned earlier by the concentration of polysaccharide. The polysaccharide chains will then by hydrogen bonding, attain certain fixed distances and form chain-like structures between which the pores are formed. By cross-linking within these structures, the size of the pores is not affected, only the rigidity of the particle J. Porath et al (J of Chromatography 103 (1975) 49-62) has studied the influence of cross-linking agents having different chain lengths on the properties of the agarose gels and found that a gel matrix of a considerably improved rigidity was obtained with cross-linking agents where the inserted molecule chain has a length of 5 atoms. A crosslinking agent which fulfilled these requirements was divinylsulphone which is a homobifunctional cross-linking agent.

In the European patent application 84850215.9 the use of homopolyfunctional cross-linking agents is described and it is shown that a further extension increase in the number of cross-linking atoms improves the rigidity The disadvantages of using such homobifunctional and homopolyfunctional cross-linking agents are several. One essential requirement is that the cross-linking agent shall be as hydrophilic as possible, because with increasing distance between the hydrophilic functional groups the hydrophilicity is reduced. This can be compensated for by using cross-linking agents containing hydroxyl groups or those which after cross-linking form hydroxyl groups. However, these hydroxyl groups affect the cross-linking. As mentioned earlier the cross-linking takes place between hydroxyl groups available on the polysaccharides. It has been shown by L Holmberg (Doctorial Thesis, Swedish University of Agricultural Sciences 1983, pp. 28-29) that upon cross-linking of polysaccharides with epichlorhydrin very little monomer cross-linking takes place, i.e., a cross-linking where only monomer epichlorhydrin participates. On the contrary, Holmberg points out that the main part ( >98%) is polymer cross-linking and/or substitution. Thus, it is seen that during the course of the cross-linking reaction one does not know the number of the atoms in the cross-linking bridge obtained This is also shown by the result with divinylsulphon (J Porath, J of Chromatogr 103 (1975) 49-62), which shows low reproducibility as regards pressure/flow.

The homopolyfunctional cross-linking agents are even more hydrophobic than epichlorhydrin. Upon cross-linking, epichlorhydrin gives rise to the most hydrophilic bridge and should therefore be ideal. However, polymer cross-linking is obtained.

DISCLOSURE OF INVENTION

The object of the present invention is to improve considerably the rigidity and at the same time minimize the non-specific interaction of a porous polysaccharide gel by a controlled built-up of the length of the cross-linking. In this way the particles can be made smaller and still fulfill the requirements for rigidity This can be completely controlled and the rigidity desired can be obtained by choosing a certain number of reaction steps. The method according to the invention has obtained the characterizing features defined in the claims.

DETAILED DESCRIPTION

To be able to control completely the cross-linking reaction the reagent used has to fulfil the following.
1. The reagent shall in the first reaction step only be able to react as a monomer, i.e., not crosslink, but substitute.
2. The reagent shall include at least one functional group that can be activated.
3. The reagent shall after activation and crosslinking given a hydrophilic bridge of a fixed length.

As an example the following monofunctional reagent with a functional group that can be activated can be used:

where X is a reactive group, e.g., a halogen.
If a polysaccharide gel e.g., agarose gel =(P), is substituted with this reagent the following is obtained:

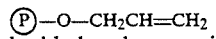 Step 1

The double bond can easily be activated and for example give rise to a halohydrin or an epoxide according to

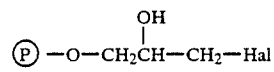 Step 2A and

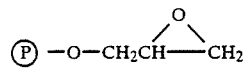 Step 2B

These can both react with a hydroxyl group on (P) or with water, and if the agarose chains are close enough to each other, a first cross-linking (alternatively a hydrolysis) can take place according to

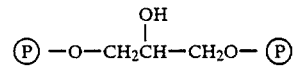 Step 3A or

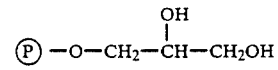 Step 3B

After these steps have been carried out, the gel is tested for rigidity and flow, and it is important that the deviation from the theoretical value which is obtained from the Blake-Kozeny's equation is small, i.e., the pressure obtained after one cycle, gives the corresponding maximum flow. If the pressure/flow curve is not satisfactory then steps 1, 2 and 3 are repeated and the pressure/flow test is carried out again. These steps are repeated until the gel is hard enough. In this way it is realized that the control over the maximum number of atoms in the crosslinking bridge is total. Below the possible number of atoms in the cross-linking is given after a certain number of cycles.

| Number of cycles | Number of atoms |
|---|---|
| 1 | 3 and/or 7 |
| 2 | 3 and/or 7 and/or 11 |
| 3 | 3 and/or 7 and/or 11 and/or 15 |
| etc |  |

By varying the number of carbon atoms in the general reaction formula

one or more reaction steps can be omitted. For example the epoxide

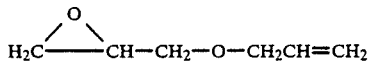

gives a product where 7 and/or 15 atoms are obtained in cycle 1.

Generally it can be written
where the requirement of B is that it shall contain at least one group that can be activated after the reagent has been substituted on the polysaccharide via A.

The structure of the respective groups then depends on what the matrix is to be used for. In gel filtration the aim is to obtain as little non-specific interaction as possible, i.e., the reagent shall be hydrophilic. In other techniques such as hydrophobic interaction the hydrophobic reagent can be chosen, i.e., a branched long whole chain substituted in B or A. In ion exchange chromatography anion-and cation exchange groups, respectively, can be included as part of the reagent.

The invention will now be described in detail by a number of examples with varying polysaccharide concentration and a varying number of repeat cycles of the reaction process above.

EXAMPLE 1

Sepharose ® suspended in water (volume ratio 1:3). Thereafter a base (mol ratio 1:15), allylbromide (mol ratio 1:10) and sodium borohydride (mol ratio 1:2) are added. The reaction mixture is stirred at room temperature. After 3–18 hours the gel is filtered on a glass filter and washed with acetone, ethanol and water to neutral pH.

The gel is suspended in water (volume ratio 1:3). Bromic water is added until a lasting yellow colored is obtained (about 10 min). The mixture is neutralized, filtered and washed with water.

The gel is suspended again in water as above and stirred with a base (mol ratio 1:2) at room temperature (3–18 hours). The gel is filtered and washed with water to neutral pH.

The gel is packed in a manner known per se and the pressure/flow curve is plotted.

The above process gives a gel rigidity increase corresponding to 50 times Sepharose ® 6B (table 1). The process is repeated as above until the desired rigidity is obtained (table 1).

EXAMPLE 2

Sepharose ® is replaced by Sepharose ®4B, and the process is repeated according to Example 1 until the desired rigidity is obtained (table 1).

EXAMPLE 3

Sepharose 6B is replaced by Sepharose ® 2B, and the process according to Example 1 is repeated until the desired rigidity is obtained (table 1).

EXAMPLE 4

Agarose particles of a concentration of 8.7% were produced according to a known technique and sieved to obtain particles of 40–60 micrometers, were reacted according to the same pattern as in Example 1. After three cycles a flow of 2230 cm . h$^{-1}$ was obtained

EXAMPLE 5

Agarose particles of a concentration of 10.7% were produced according to a known technique and sieved to obtain particles of 40–60 micrometers and were reacted according to the same pattern as in Example 1. After three cycles a flow of 3200 cm . h$^{-1}$ was obtained at a pressure of 2.3 MPa. The theoretical pressure drop in the column according to Blake-Kozeny's equation was 2.0 MPa.

The gels cross-linked according to the above examples can, of course, be further stabilized by the use of the bifunctional or polyfunctional cross-linking agents mentioned above in a manner known per se. This can be done after any number of cycles. Example 6 below refers to a combination of the two cross-linking methods.

EXAMPLE 6

30 ml gel produced according to Example 4 (flow 2230 cm h$^{-1}$) is suspended in 60 ml of water. Over a period of 5 hours 11 ml epichlorhydrin, 2 g sodium borohydride and 10 ml 45% sodium hydroxide are added. The mixture is stirred at 50° C., and then filtered and washed with water to neutral pH. The gel is packed in a manner known per se and the pressure/flow curve is plotted. This curve showed a maximum flow of 3060 cm . h$^{-1}$.

CHROMATOGRAPHIC PERFORMANCE

The matrix produced in Example 5 was packed in a column and tested with regard to gel filtration. The matrix showed an exclusion limit for proteins at about $3 \times 10^5$ daltons. Proteins that are normally difficult to gel filter (chymotrypsinogen, cytochrom c), showed good linearity with the molecular weight curve plotted at a salt amount of 0.1 M sodium chloride and pH 7 (0.01 phosphate buffer).

TABLE 1

| Type of Gel | Flow (cm · h$^{-1}$) | Improvement over Sepharose ® B | Improvement over Sepharose ® CL-B |
|---|---|---|---|
| Sepharose ® 6B | ~14[1] | | |
| Sepharose ® CL-6B | ~30[1] | | |
| Ex. 1, 1 cycle | 720 | 50 | 25 |
| Ex. 1, 2 cycles | 1670 | 120 | 55 |
| Ex. 1, 3 cycles | 2250 | 160 | 75 |
| Sepharose ® 4B | 11,5[1] | | |
| Sepharose ® CL-4B | 26[1] | | |
| Ex. 2, 1 cycle | 900 | 78 | 35 |
| Ex. 2, 2 cycles | 1100 | 95 | 42 |
| Sepharose ® 2B | ~10[1] | | |
| Sepharose ® CL-2B | ~15[1] | | |
| Ex. 3, 1 cycle | 160 | 16 | 11 |
| Ex. 3, 2 cycles | 400 | 40 | 27 |
| Ex. 3, 3 cycles | 500 | 50 | 33 |
| Ex. 4, 3 cycles | 2230 | | |
| Ex. 5, 3 cycles | 3200 | | |
| Ex. 6 | 3060 | | |

[1]Data taken from "Gel filtration, theory and practice", Pharmacia Fine Chemicals, 1979.

I claim:
1. Process of cross-linking a porous agarose gel, comprising the steps of:
   (a) reacting the agarose gel with a monofunctional reagent A—B, where A is a halogen atom or an epoxide group and B contains a double bond, under alkaline conditions;
   (b) activating said double bond of the reagent bound to the agarose gel to give an epoxide or a halohydrin; and
   (c) reacting the epoxide or halohydrin with hydroxyl groups on the agarose gel under alkaline conditions so that cross-linking takes place.
2. The process of claim 1 wherein the monofunctional reagent has the formula:

wherein X is a halogen or an epoxy group.

3. The process of claim 1 wherein the monofunctional reagent has the formula:

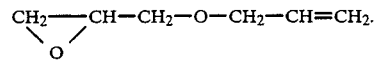

4. The process of claim 2 wherein the double bond is activated with bromine water.

* * * * *